United States Patent

Harper

[15] 3,648,072

[45] Mar. 7, 1972

[54] HIGH-SPEED GATING CIRCUIT

[72] Inventor: Leonard Roy Harper, San Jose, Calif.

[73] Assignee: International Business Machines Corporation, Armonk, N.Y.

[22] Filed: Feb. 19, 1969

[21] Appl. No.: 804,355

Related U.S. Application Data

[63] Continuation of Ser. No. 465,592, June 21, 1965, abandoned.

[52] U.S. Cl. ................................307/247, 307/246, 307/291

[51] Int. Cl. ........................................H03k 17/00, H03k 3/12

[58] Field of Search ..........................307/246, 253, 291, 247

[56] References Cited

OTHER PUBLICATIONS

" Direct- Coupled- Type Ring Counter," by R. W. Carney, pgs. 7- 32 Mil- HDBK- 215, June 15, 1960.

*Primary Examiner*—John Zazworsky

*Attorney*—Hanifin and Jancin

[57] ABSTRACT

A gating circuit suitable for operating a circuit such as a bistable multivibrator at high speed wherein a gating transistor has a small capacitor coupled between the base of the transistor and ground. A gating pulse is coupled through a resistor to the base of the gating transistor to temporarily store a charge in the capacitor. A set pulse signal applied in the next instant of time to the emitter of the gating transistor causes the gating transistor to be turned on to produce at the collector of the gating transistor, a current pulse that is sufficient to control the bistable multivibrator circuit.

3 Claims, 4 Drawing Figures

INVENTOR
LEONARD ROY HARPER

BY *Otto Schmid, Jr.*

ATTORNEY

HIGH-SPEED GATING CIRCUIT

CROSS REFERENCE TO RELATED APPLICATIONS

This application is a continuation of application Ser. No. 465,592 filed June 21, 1965, now abandoned.

BACKGROUND OF THE INVENTION

This invention relates to electronic gating circuits and more particularly to a high-speed gating circuit suitable for use in monolithic integrated circuits.

In prior art diode-gating circuits it is now common practice to provide a series coupling capacitor to store a charge that is delivered to a trigger to operate the trigger in response to gating potentials used to charge or discharge the capacitors. In the present state of the monolithic integrated circuit art, such coupling capacitors are inefficient since they occupy large areas of the monolithic chip and have a large charge dissipation to the ground of the substrate. In the present state of the monolithic integrated circuit art, it is relatively easy to obtain small capacitors that are coupled to the ground of the substrate. It is therefore the principal object of this invention to provide a gating circuit having the advantages of the prior art circuits, but which requires only small shunt capacitances so that the circuit can be easily implemented in monolithic integrated circuit design.

As the speed of the circuits increases and the signal swing decreases it becomes more difficult to insure that signals arrive at the precise time required and at the precise voltage amplitude, with the result that errors may occur or that the switching speed may be slowed. It is therefore another object of the invention to provide a gating circuit wherein a charge stored in a small shunt capacitor in response to a gating pulse is effective to operate a trigger reliably at high speed upon the application of a set pulse in the next instant of time.

According to the invention there is provided a gating circuit suitable for operating utilization circuit such as a trigger at high speed. The gating circuit comprises a gating transistor, an impedance element coupled to the base of the gating transistor and a small capacitor which is coupled between the base of the gating transistor and ground. The collector of the coupling transistor is coupled to the utilization circuit. A positive gating pulse is applied through the impedance element and a small charge is stored in the small capacitor thereby. A negative set pulse signal then applied to the emitter of the coupling transistor discharges the capacitor, and the picocoulombs of storage of the capacitor are effectively multiplied by the beta of the gating transistor to produce a current pulse that is sufficient to control the utilization circuit.

The foregoing and other objects, features and advantages of the invention will be apparent from the following more particular description of preferred embodiments of the invention, as illustrated in the accompanying drawings.

The gating circuit comprising the invention is shown applied to gating a bistable multivibrator although the invention is not so limited but is broadly applicable to all gating circuit applications.

Figure 1:
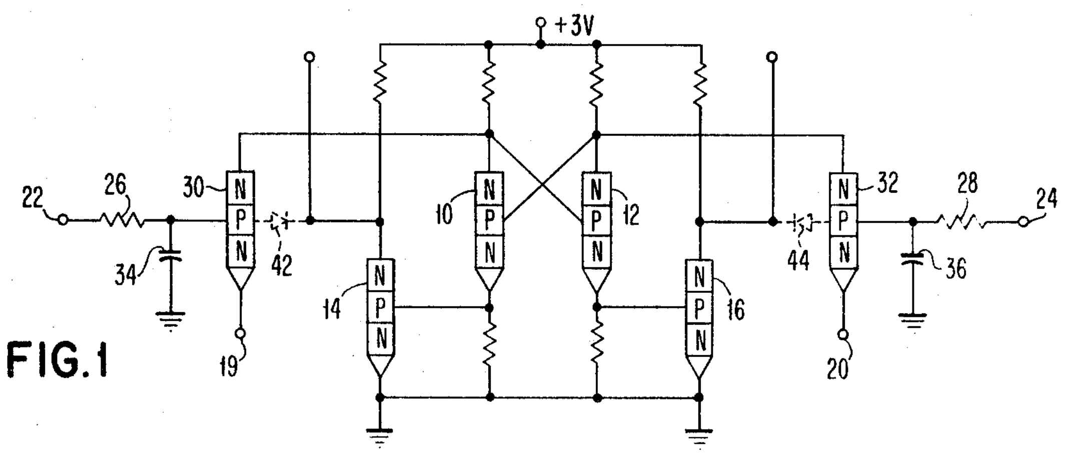
FIG. 1 is a schematic diagram of a trigger circuit embodying the invention.

Referring to the drawing, the embodiment of the invention shown in FIG. 1 comprises a bistable multivibrator comprising a gate control stage made up of directly cross-coupled emitter followers 10 and 12. A pair of transistor inverters 14 and 16 provide alternate output voltage levels in responses to change in the conduction status of the gate control stage initiated by pulses applied to the set input terminals 19 and 20 and the gate input terminals 22 and 24. Such a bistable multivibrator is claimed in my copending application, Ser. No. 420,504, filed Dec. 23, 1964, now abandoned and reference may be had to that application for a more detailed description of the operation. The gating circuit comprises a resistor 26 and 28 coupled between the gating inputs and the base of gating transistors 30, 32. A small capacitor 34, 36 is coupled between the base of the gating transistors and ground. The set input is coupled to the emitter of the gating transistors at terminals 19, 20. The collector of the gating transistors 30, 32 is coupled to the collector of the emitter followers 10 and 12 comprising the gate control stage. A typical value for capacitors 34, 36 is 5 picofarads and a typical value for resistors 26, 28 is 2,200 ohms. The capacitor functions to store a charge due to the gating pulse so that reliable operation at switch-conditioning speeds in the order of 10 nanoseconds results. This operating speed is obtained even in cases in which the gate and set pulses may not be precisely coincident such as in shift register operation in which the same clock pulse is used both as an advance pulse and also as a triggering pulse and in cases in which the pulse is not up to the rated amplitude at coincidence.

Figure 3:
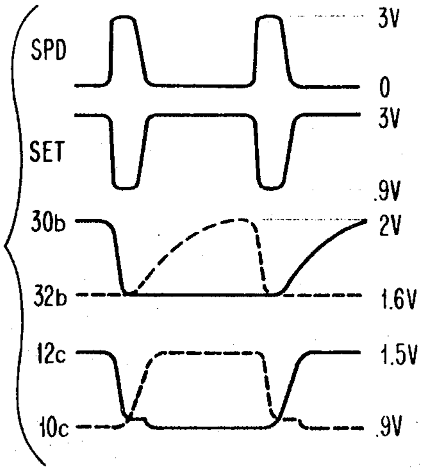
FIG. 3 is a set of voltage waveforms on a time scale showing typical input gating pulses and the resulting output pulses of the circuit shown in FIG. 1.

In FIG. 1, assuming that the trigger is set so that transistor 10 is conducting current, its collector is at approximately .9 volts and the collector of transistor 12 is at 1.5 volts. If at this time a gating potential is applied in a binary fashion to both gating inputs 22, 24 raising them to above 2.2 volts, the base of gating transistor 32 rises to about 2.2 volts because of the diode action between the collector and its base, while the base of transistor 30 rises to approximately 1.6 volts. Therefore, at this time the stored charge on the base of transistor 30 on the capacitor 34 to ground from the base of transistor 30 is less than the capacitor 36 to ground from the base of transistor 32. If at this time the set pulse signals are applied to the emitters of transistors 30 and 32 the emitters are brought from 2 volts or above down to .9 volt, as shown in the set pulse waveform in FIG. 3, and only transistor 32 will draw current. This action causes current steering in the trigger and reverses the state of the trigger. The action of the trigger gating can be seen by referring to the waveforms shown in FIG. 3 wherein the first waveform is the input to the sample pulse driver and the second waveform is the set pulse input. The third set shows the waveform at the base of the gating transistor with the waveform at the base of transistor 30 shown in full line and the waveform at the base of transistor 32 shown in dotted line. The fourth set shows the voltage waveform at the collector of the emitter followers with the waveform for transistor 12 shown in full line and the waveform for transistor 10 shown in dotted line. Inherent steering is provided from the gating transistors because of the voltage level to which the collectors of the transistors 10 and 12 are coupled and this voltage would normally be either about .9 volt or 1.5 volts. The sample pulse driver (not shown) is designed to insure that the output goes down to approximately .9 volt and not below. This is accomplished by coupling the emitter of the input transistor to the base of the output transistor and the collector of the input transistor to the collector of the output transistor so that the output voltage is essentially the sum of the $V_{ce}$ of the input transistor and the $V_{be}$ of the output transistor.

The steering action described above provides satisfactory operation for most applications. However, in some applications, particularly in those applications in which a large number of gating inputs are provided to the trigger, the two diodes 42, 44 shown dotted in FIG. 1, may be added to the circuit to provide more complete steering of the bases of transistors 30, 32. The diode is coupled from the base of the gating transistor 30, 32 to the collector of the output transistor 14, 16. This circuit addition causes the base of the unselected transistor 30 or 32 to be dropped below the 1.6 volts described above for transistor 30. The diode 42 shown connecting the base of the transistor 30 to the collector of transistor 14 accomplishes this since transistor 14 is saturated at this time and the combined voltage drops lower that base to about 1 volt. This insures that any overshoot which occurs in the sample pulse driver output does not cause pulse-triggering or delay the steering, and therefore the triggering action, of the trigger.

Figure 2:
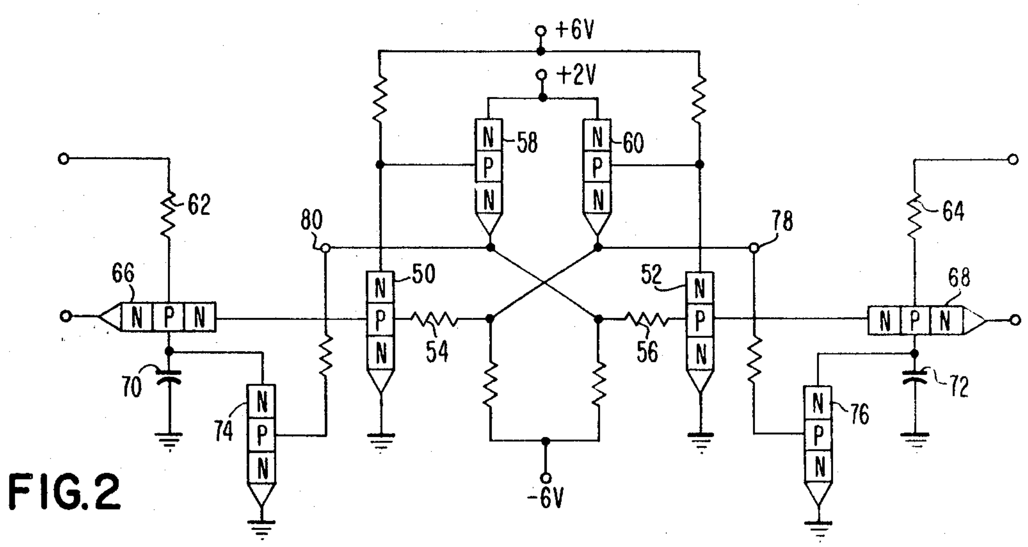
FIG. 2 is a schematic diagram of an alternate embodiment of a trigger circuit embodying the invention.

The second embodiment of this invention shown in FIG. 2 is based on a circuit family in which the voltage swings are approximately 1.7 volts or 1.8 volts to −.5 volt, and in this circuit family all swings are centered equally around the threshold voltage of the silicon transistor employed in it, which is approximately .6 volt or .7 volt. In this circuit family no divider is necessary to drive an inverter 50, 52 and the simple series resistor 54, 56 from the emitter followers 58, 60 to the inverters is sufficient to bias the inverters on or to hold them cut off. In this trigger the collectors are tied to a higher voltage and the off inverter will go above 2 volts until the emitter follower is saturated holding its output at about 1.7 volts to about 1.8 volts which turns on the other inverter and holds its emitter follower down to −.5 volt.

Figure 4:
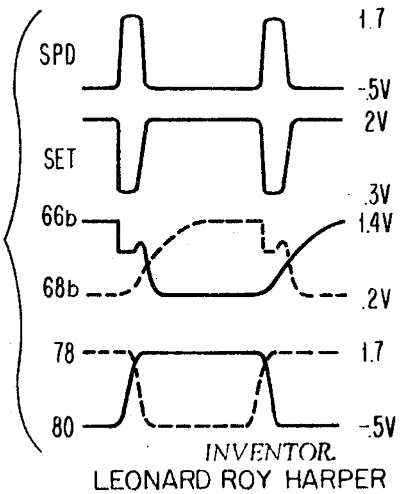
FIG. 4 is a set of voltage waveforms on a time scale showing typical input gating pulses and the resulting output pulses of the circuit shown in FIG. 2.

The gating is similar to the previously described circuit with the gating pulses applied through resistors 62, 64 to the base of gating transistors 66, 68. Small value capacitors 70, 72 are coupled between the base of the gating transistors and ground. The sample pulse driver (not shown) does not have to be held at .9 volt since the levels at which the coupling capacitor works are relative to the .7 volt base voltage necessary to turn on the inverter. The waveforms for the operation of this trigger are shown in FIG. 4. The first waveform shows the input to the sample pulse driver and the second waveform shows the set pulse input. The third set of waveforms shows the voltage at the base of gating transistor 66, 68 with that for transistor 66 shown in full line and that for transistor 68 shown in dotted line. The fourth set shows the waveform at output terminals 78, 80 with the waveform at output 78 shown dotted and the output waveform at terminal 80 shown in full line. A gate voltage of 1.8 volts applied to the base of transistor 66 through resistor 62 charges this base up to the $V_{be}$ of transistor 50 and the collector to base diode junction of transistor 66 to approximately 1.4 volts. While this charge is not sufficient to cut off transistor 50, this charge is effectively multiplied by the beta of transistor 66 so that the resultant signal easily cuts off transistor 50 thereby changing the state of the trigger.

Sampling is accomplished by transistors 74, 76 which discharge the capacitor in the unwanted gate. The value of gating resistors 62, 64 must be such that the current, when the base of a gating transistor is at 1.4 volts, is not sufficient to overcome the biasing of resistors 54, 56 when steering is not employed. The effect of time constants is still very short compared to previously disclosed triggers and the use of a high gating resistor is not detrimental to the high-speed performance of the trigger. A circuit built according to this embodiment performed reliably with a gate conditioning time of 10 nanoseconds and a 33-megacycle repetition rate.

While the invention has been particularly shown and described with reference to preferred embodiments thereof, it will be understood by those skilled in the art that various changes in form and details may be made therein without departing from the spirit and scope of the invention.

What is claimed is:

1. A bistable circuit arrangement comprising:
a source of gating pulses and a source of set pulses;
a bistable device capable of being triggered from one stable state to the other by signals applied to triggering input terminals to produce corresponding output signals at the corresponding output terminals;
a first and a second gating circuit each comprising a gating transistor having a collector, base and emitter,
a first impedance element coupled to the base of said first gating transistor;
a second impedance element coupled to the base of said second gating transistor;
a small value capacitor coupled between the base of each of said gating transistors and a reference potential;
means for coupling the collector of each of said gating transistors to the corresponding one of said triggering input terminals;
means for connecting said source of gating pulses through said impedance elements to temporarily store a charge in each of said capacitors;
means for connecting said source of set pulses to the emitters of said gating transistors to discharge the charge stored in the corresponding one of said capacitors and produce an output signal at the collector of said gating transistor which is operable to change the state of said bistable circuit; and
means operable in response to the change in state of said bistable device to discharge the other of said capacitors.

2. The combination in accordance with the claim 1 wherein said means for discharging the other of said capacitors comprises a steering transistor coupled between a corresponding output terminal of said bistable device and said gating transistor.

3. A bistable circuit arrangement comprising:
a source of gating pulses and a source of set pulses;
a bistable circuit capable of being triggered from one state to the other comprising a pair of switching transistors and a pair of output transistors;
a pair of gating circuits each comprising a gating transistor and a steering transistor;
each of said gating and said steering transistors having an emitter, base and collector;
first and second impedance elements coupled to the respective bases of each of said gating transistors;
first and second value capacitors coupled from the respective bases of said gating transistors to a reference potential;
means for coupling the collector of each of said gating transistors to the base of said corresponding switching transistor;
means for coupling the base of each of said steering transistors to the emitter of the corresponding output transistor;
means for coupling the collector of said steering transistor to the base of the corresponding gating transistor;
means for coupling the emitter of said steering transistor to the reference potential;
means for coupling said gating pulses through said impedance elements to store a charge in said capacitors;
means for connecting the source of set pulses to the emitters of said gating transistors to discharge one of said capacitors and produce an output from said gating transistor to change the state of said bistable circuit;
said new output state being coupled to turn on the opposite steering transistor to discharge the other capacitor.

* * * * *